US012650355B2

(12) United States Patent
Lee et al.

(10) Patent No.: US 12,650,355 B2
(45) Date of Patent: Jun. 9, 2026

(54) HYDROGEN LEAKAGE MONITORING SYSTEM, VEHICLE USING THE SAME AND HYDROGEN LEAKAGE MONITORING METHOD USING THE SAME

(71) Applicant: INDUSTRIAL TECHNOLOGY RESEARCH INSTITUTE, Hsinchu (TW)

(72) Inventors: Shao-Yu Lee, Zhudong Township (TW); Bing-Ren Chen, New Taipei City (TW); Tien-Ho Gau, Hsinchu City (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 311 days.

(21) Appl. No.: 18/403,591

(22) Filed: Jan. 3, 2024

(65) Prior Publication Data

US 2025/0137868 A1 May 1, 2025

(30) Foreign Application Priority Data

Nov. 1, 2023 (TW) ................................. 112142045

(51) Int. Cl.
*G01M 3/04* (2006.01)
*G01C 9/02* (2006.01)
(52) U.S. Cl.
CPC .................. *G01M 3/04* (2013.01); *G01C 9/02* (2013.01)
(58) Field of Classification Search
CPC .................................... G01M 3/04; G01C 9/02
See application file for complete search history.

(56) References Cited

U.S. PATENT DOCUMENTS

2010/0198430 A1 8/2010 Zanardelli et al.
2014/0019027 A1 1/2014 Kojima
(Continued)

FOREIGN PATENT DOCUMENTS

CN 1460304 A 12/2003
CN 101678804 B 12/2011
(Continued)

OTHER PUBLICATIONS

Taiwanese Office Action and Search Report for Taiwanese Application No. 112142045, dated Jul. 2, 2024.
(Continued)

*Primary Examiner* — David Z Huang
(74) *Attorney, Agent, or Firm* — Birch, Stewart, Kolasch & Birch, LLP

(57) ABSTRACT

A hydrogen leakage monitoring system is disposed on a vehicle body of a vehicle. The hydrogen leakage monitoring system includes a speed sensor, an inclination sensor, a hydrogen concentration sensor and a processor. The speed sensor is configured to sense a vehicle speed. The inclination sensor is configured to sense an inclination angle of the vehicle body. The hydrogen concentration sensor is configured to sense an actual hydrogen leakage value of a hydrogen device. The processor is configured to obtain the inclination degree value according to the vehicle speed and the inclination angle, obtain a hydrogen leakage threshold according to the inclination degree value, and initiate a corresponding process based on the actual hydrogen leakage value being greater than the hydrogen leakage threshold.

15 Claims, 5 Drawing Sheets

(56) References Cited

U.S. PATENT DOCUMENTS

| | | | | |
|---|---|---|---|---|
| 2017/0151867 A1* | 6/2017 | Aso | ................... | B01D 19/0063 |
| 2022/0134891 A1* | 5/2022 | Yanagiura | ......... | H01M 8/04776 |
| | | | | 180/65.1 |
| 2022/0292895 A1 | 9/2022 | Ren et al. | | |
| 2023/0051111 A1 | 2/2023 | Cyrus et al. | | |

FOREIGN PATENT DOCUMENTS

| | | | |
|---|---|---|---|
| CN | 105299464 A | 2/2016 |
| CN | 111213004 A | 5/2020 |
| CN | 114674373 A | 6/2022 |
| CN | 114912879 A | 8/2022 |
| CN | 116193292 A | 5/2023 |
| DE | 4341437 C1 | 1/1995 |
| JP | 2004-82793 A | 3/2004 |
| TW | 202317900 A | 5/2023 |

OTHER PUBLICATIONS

Barbir, "Safety issues of hydrogen in vehicles", Jan. 1999, total of 5 pages.

Ehrhart et al., "Risk Assessment of Hydrogen Fuel Cell Electric Vehicles in Tunnels", Sep. 14, 2019, total of 16 pages.

Lee et al., "Assessment of Safety for Hydrogen Fuel Cell Vehicle", Sep. 12, 2011, total of 9 pages.

Liu et al., "Research on Hydrogen Fuel Cell Safety Detection Analysis Based on Leakage Quality Limit Detection Method", AMTMS-2021, Journal of Physics: Conference Series 2174(2022) 012049, total of 10 pages.

Sachs et al., "Safety Aspects of Hydrogen Fuel Cell Vehicles", 18th World Hydrogen Energy Conference 2010—WHEC 2010, pp. 249-252.

Toyota Motor Corporation, "New Mirai, Press Information 2020", total of 41 pages.

\* cited by examiner

HYDROGEN LEAKAGE MONITORING SYSTEM, VEHICLE USING THE SAME AND HYDROGEN LEAKAGE MONITORING METHOD USING THE SAME

This application claims the benefit of Taiwan application Serial No. 112142045, filed Nov. 1, 2023, the disclosure of which is incorporated by reference herein in its entirety.

TECHNICAL FIELD

The disclosure relates to a hydrogen leakage monitoring system, a vehicle using the same and a hydrogen leakage monitoring method using the same.

BACKGROUND

In order to detect whether hydrogen leakage occurs in a hydrogen-powered vehicle, the hydrogen-powered vehicle is generally equipped with a hydrogen concentration sensor. When the vehicle body overturns, depending on an installation position of the hydrogen concentration sensor, it is possible that the hydrogen concentration value sensed by the hydrogen concentration sensor will not exceed the hydrogen leakage safety threshold until the hydrogen gas leakage for a period of time, and the corresponding measure will be taken. However, the hydrogen leakage that take a period of time to detect will increase the risk. Therefore, proposing a hydrogen leakage monitoring system that may improve the aforementioned conventional problems is one of the goals of those in this technical field.

SUMMARY

According to an embodiment, a hydrogen leakage monitoring system is provided. The hydrogen leakage monitoring system is configured to be disposed on a vehicle body of a vehicle. The hydrogen leakage monitoring system includes a speed sensor, an inclination sensor, a hydrogen concentration sensor and a processor. The speed sensor is configured to sense a vehicle speed of the vehicle body. The inclination sensor is configured to sense an inclination angle of the vehicle body. The hydrogen concentration sensor is configured to sense an actual hydrogen leakage value of a hydrogen device. The processor is configured to obtain an inclination degree value according to the vehicle speed and the inclination angle, obtain a hydrogen leakage threshold according to the inclination degree value, and initiate a corresponding measure based on the actual hydrogen leakage value being greater than the hydrogen leakage threshold.

According to another embodiment, a vehicle is provided. The winding system vehicle includes a vehicle body and a hydrogen leakage monitoring system. The hydrogen leakage monitoring system is disposed on the vehicle body. The hydrogen leakage monitoring system includes a speed sensor, an inclination sensor, a hydrogen concentration sensor and a processor. The speed sensor is configured to sense a vehicle speed of the vehicle body. The inclination sensor is configured to sense an inclination angle of the vehicle body. The hydrogen concentration sensor is configured to sense an actual hydrogen leakage value of a hydrogen device. The processor is configured to obtain an inclination degree value according to the vehicle speed and the inclination angle, obtain a hydrogen leakage threshold according to the inclination degree value, and initiate a corresponding measure based on the actual hydrogen leakage value being greater than the hydrogen leakage threshold.

According to another embodiment, a hydrogen leakage monitoring method is provided. The hydrogen leakage monitoring method includes the following steps: sensing a vehicle speed of a vehicle body by a speed sensor; sensing an inclination angle of the vehicle body by an inclination sensor; obtaining an inclination degree value according to the vehicle speed and the inclination angle by a processor; sensing an actual hydrogen leakage value of a hydrogen device by a hydrogen concentration sensor; obtaining a hydrogen leakage threshold according to the inclination degree value by the processor; and initiating a corresponding measure based on the actual hydrogen leakage value being greater than the hydrogen leakage threshold by the processor.

Figure 1:
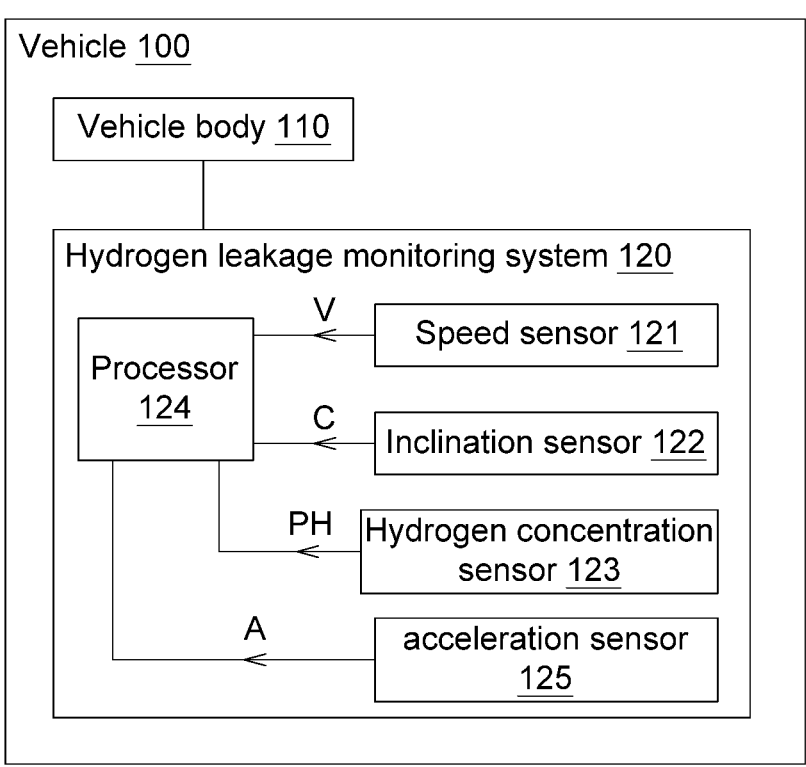
FIG. 1 illustrates a functional block diagram of a vehicle according to an embodiment of the present disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically illustrated in order to simplify the drawing.

DETAILED DESCRIPTION

Figure 2:
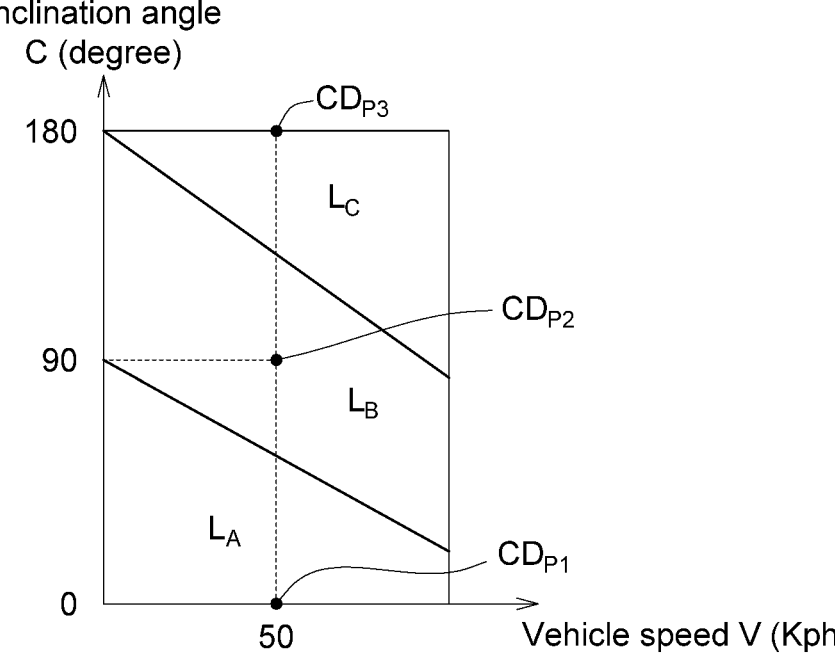
FIG. 2 illustrates a schematic diagram of a relationship between a vehicle speed and an inclination angle of the vehicle in FIG. 1.
Figure 3:
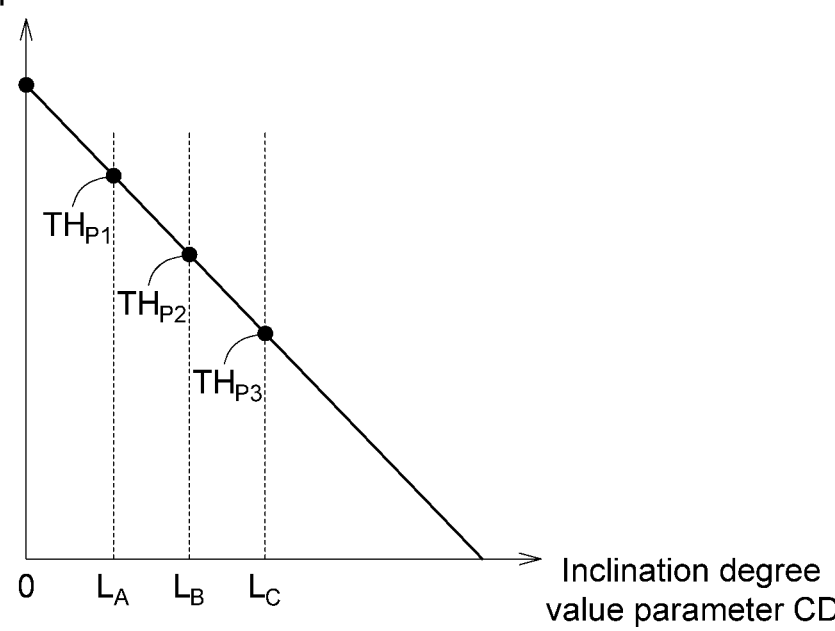
FIG. 3 illustrates a schematic diagram of a relationship between an inclination degree value parameter of the vehicle and a hydrogen leakage threshold parameter in FIG. 1.
Figure 4A:
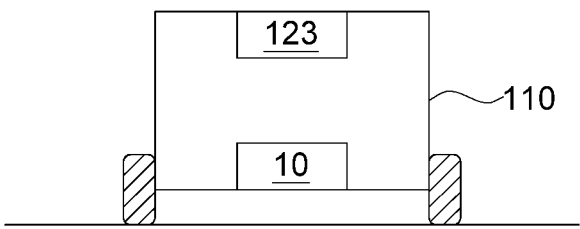
FIG. 4A illustrates a schematic diagram of the inclination angle of the vehicle in FIG. 1 being 0 degree.
Figure 4B:
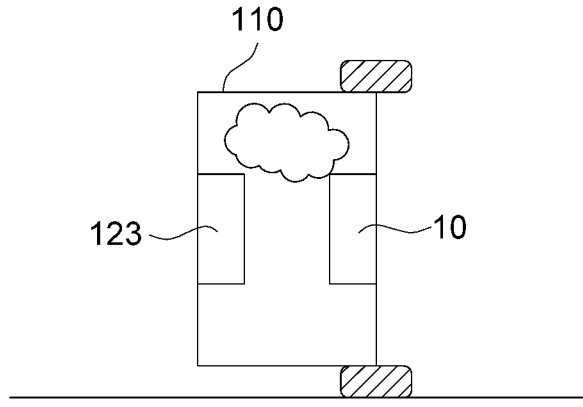
FIG. 4B illustrates a schematic diagram of the inclination angle of the vehicle in FIG. 1 being 90 degrees.
Figure 4C:
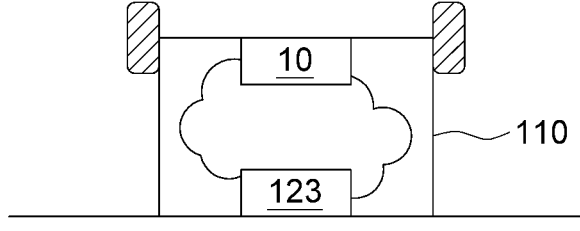
FIG. 4C illustrates a schematic diagram of the inclination angle of the vehicle in FIG. 1 being 180 degrees.

Referring to FIGS. 1 to 4C, FIG. 1 illustrates a functional block diagram of a vehicle 100 according to an embodiment of the present disclosure, FIG. 2 illustrates a schematic diagram of a relationship between a vehicle speed V and an inclination angle C of the vehicle 100 in FIG. 1, FIG. 3 illustrates a schematic diagram of a relationship between an inclination degree value parameter CD of the vehicle 100 and a hydrogen leakage threshold parameter TH in FIG. 1, FIG. 4A illustrates a schematic diagram of the inclination angle C of the vehicle 100 in FIG. 1 being 0 degree, FIG. 4B illustrates a schematic diagram of the inclination angle C of the vehicle 100 in FIG. 1 being 90 degrees, and FIG. 4C illustrates a schematic diagram of the inclination angle C of the vehicle 100 in FIG. 1 being 180 degrees. The vehicle 100 is, for example, a vehicle applying a hydrogen energy power system.

As illustrated in FIG. 1, the vehicle 100 includes a vehicle body 110 and a hydrogen leakage monitoring system 120. The hydrogen leakage monitoring system 120 may be disposed on the vehicle body 110. The hydrogen leakage monitoring system 120 may be a portion of a vehicle electronic control system (not illustrated), or may be integrated into the vehicle electronic control system. The hydrogen leakage monitoring system 120 includes a speed sensor 121, an inclination sensor 122, a hydrogen concentration sensor 123, a processor 124 and an acceleration sensor 125.

As illustrated in FIG. 1, the speed sensor 121 is configured to sense the vehicle speed V of the vehicle body 110. The inclination sensor 122 is configured to sense an inclination angle C of the vehicle body 110. The hydrogen concentration sensor 123 is configured to sense an actual hydrogen leakage value PH of a hydrogen device 10. The processor 124 is configured to: obtain an inclination degree value according to the vehicle speed V and the inclination angle C; obtain the hydrogen leakage threshold according to the inclination degree value; and initiate a corresponding measure based on the actual hydrogen leakage value PH being greater than the hydrogen leakage threshold. As a result, when hydrogen leakage occurs, the hydrogen leakage monitoring system 120 may initiate the corresponding measure (for example, cutting off the power, sounding an alarm, cutting off the valve of the hydrogen device 10, and other measure to prevent the danger from being expanding) according to the inclination degree value of the vehicle body 110. In addition, in an embodiment, the hydrogen leakage monitoring system 120 determines whether to initiate corresponding measure according to the inclination degree value of the vehicle body 110, regardless of the location of the hydrogen concentration sensor 123 relative to the vehicle body 110. Furthermore, the "initiate corresponding measure" in the present embodiment of the present disclosure are not affected by the arrangement position of the hydrogen concentration sensor 123.

At least one of the speed sensor 121, the inclination sensor 122, the hydrogen concentration sensor 123, the processor 124 and the acceleration sensor 125 is, for example, integrated into the vehicle electronic control system (not illustrated), or it is a sub-component of the vehicle electronic control system. The inclination sensor 122 is, for example, a gyroscope. In addition, the processor 124 is, for example, a physical circuit, for example, a semiconductor chip, a semiconductor package, etc., formed by using at least one semiconductor process.

In an embodiment, the hydrogen device 10 is, for example, a container containing hydrogen gas. The hydrogen device 10 may, for example, provide the vehicle 100 with the hydrogen power fuel. In addition, the unit of the actual hydrogen leakage value PH and the hydrogen leakage threshold is, for example, kppm, and the unit of the vehicle speed V is, for example, kilometers per hour (kph).

In an embodiment, the inclination angle C is, for example, greater than 0 degrees, for example, a real number ranging between 0 degrees and 180 degrees. For example, the inclination angle C of the vehicle 100 illustrated in FIG. 4A is 0 degrees (i.e., not incline), the inclination angle C of the vehicle 100 illustrated in FIG. 4B is 90 degrees, and the inclination angle C of the vehicle 100 illustrated in FIG. 4C is 180 degrees (i.e., overturned). In addition, "the inclination angle C of the vehicle 100 is 0 degrees" means that the vehicle 100 is in a horizontal posture, for example. When the vehicle 100 travels on an inclined road, the vehicle 100 is also inclined, that is, the inclination angle C is not 0 degrees.

As illustrated in FIG. 3, the processor 124 may obtain the hydrogen leakage threshold corresponding to the inclination degree value according to a corresponding relationship between the inclination degree value parameter CD and the hydrogen leakage threshold parameter TH. The inclination degree value is a value of the inclination degree value parameter CD, and the hydrogen leakage threshold is a value of the hydrogen leakage threshold parameter TH. In an embodiment, the inclination degree value may be inversely proportional to the hydrogen leakage threshold.

As illustrated in FIGS. 2, 3 and 4A, in the case of the vehicle speed V being 50 kph and the inclination angle C of the vehicle 100 being 0 degrees, for example, the processor 124 obtains the inclination degree value $CD_{P1}$ which is in a $L_A$ area (as illustrated in FIG. 2), obtains the hydrogen leakage threshold $TH_{P1}$ (as illustrated in FIG. 3) according to the inclination degree value CDP1 in the LA area, determine whether the actual hydrogen leakage value PH is greater than the hydrogen leakage threshold $TH_{P1}$, and initiate corresponding measure if the actual hydrogen leakage value PH is greater than the hydrogen leakage threshold $TH_{P1}$.

As illustrated in FIGS. 2, 3 and 4B, in the case of the vehicle speed V being 50 kph and the inclination angle C of the vehicle 100 being 90 degrees, for example, the processor 124 obtains the inclination degree value $CD_{P2}$ which is in the $L_B$ area (as illustrated in FIG. 2), obtains the hydrogen leakage threshold $TH_{P2}$ (as illustrated in FIG. 3) according to the inclination degree value CDP2 in the $L_B$ area, determine whether the actual hydrogen leakage value PH is greater than the hydrogen leakage threshold $TH_{P2}$, and initiate corresponding measure if the actual hydrogen leakage value PH is greater than the hydrogen leakage threshold $TH_{P2}$.

As illustrated in FIGS. 2, 3 and 4C, in the case of the vehicle speed V being 50 kph and the inclination angle C of the vehicle 100 being 180 degrees, for example, the processor 124 obtains the inclination degree value $CD_{P3}$ which is in the $L_C$ area (as illustrated in FIG. 2), obtains the hydrogen leakage threshold value $TH_{P3}$ (as illustrated in FIG. 3) according to the inclination degree value CDP3 in the $L_C$ area, and determine whether the actual hydrogen leakage value PH is greater than the hydrogen leakage threshold $TH_{P3}$, and initiate corresponding measure if the actual hydrogen leakage value PH is greater than the hydrogen leakage threshold $TH_{P3}$.

Comparing the different inclination angles C of the vehicle body 110, it may be seen that when the inclination angle C of the vehicle body 110 is larger, the hydrogen leakage threshold is lower, and the threshold for initiating corresponding measure is lower. As a result, when a leakage occurs, the hydrogen leakage monitoring system 120 may immediately initiate corresponding measure according to the inclination degree of the vehicle body, thereby immediately preventing the occurrence or expansion of the danger.

In an embodiment, the processor 124 is further configured to: obtain a stationary time point of the vehicle speed V being 0 based on the vehicle speed V being 0 (it is not limited by the inclination angle C in this embodiment); and obtain the inclination degree value according to the vehicle speed V at a point before a period of time from the stationary time point. The "period of time" here is, for example, 5 seconds to 10 seconds, shorter or longer. In the present embodiment, the processor 124 takes the vehicle speed at a time point before a period of time from the vehicle speed being 0 as the vehicle speed V in FIG. 2.

In another embodiment, based on the inclination angle C being equal to or greater than 90 degrees and the vehicle speed V is 0, the stationary time point at which the vehicle speed V is 0 is obtained; and the inclination degree value is obtained according to the inclination angle C and the vehicle speed V at a point before a period of time from the stationary time point. The "period of time" here is, for example, 5 seconds to 10 seconds, shorter or longer. In the present embodiment, when the vehicle body 110 overturns, the vehicle body 110 starts to incline until the inclination angle C is equal to or greater than 90 degrees, and the vehicle speed V gradually changes to 0 (stationary). Furthermore, when the vehicle speed V of the vehicle body 110 is 0 and the inclination angle C is equal to 90 degrees (when the vehicle body 110 overturns, the tire tread is off the ground and therefore slides until the vehicle body 110 stops), the vehicle speed V at a time point before 5 seconds is 50 kph, then the processor 124 obtains the inclination degree value $CD_{P2}$ in the $L_B$ area (as illustrated in FIG. 2) according to the vehicle speed V being 50 kph and the inclination angle C being equal to 90 degrees.

A relationship curve between the inclination degree value parameter CD and the hydrogen leakage threshold parameter TH in FIG. 3 is the relationship curve when no collision occurs. In another embodiment, the relationship between the inclination degree value parameter CD and the hydrogen leakage threshold parameter TH may also consider the occurrence of collision, as described below.

Figure 5:
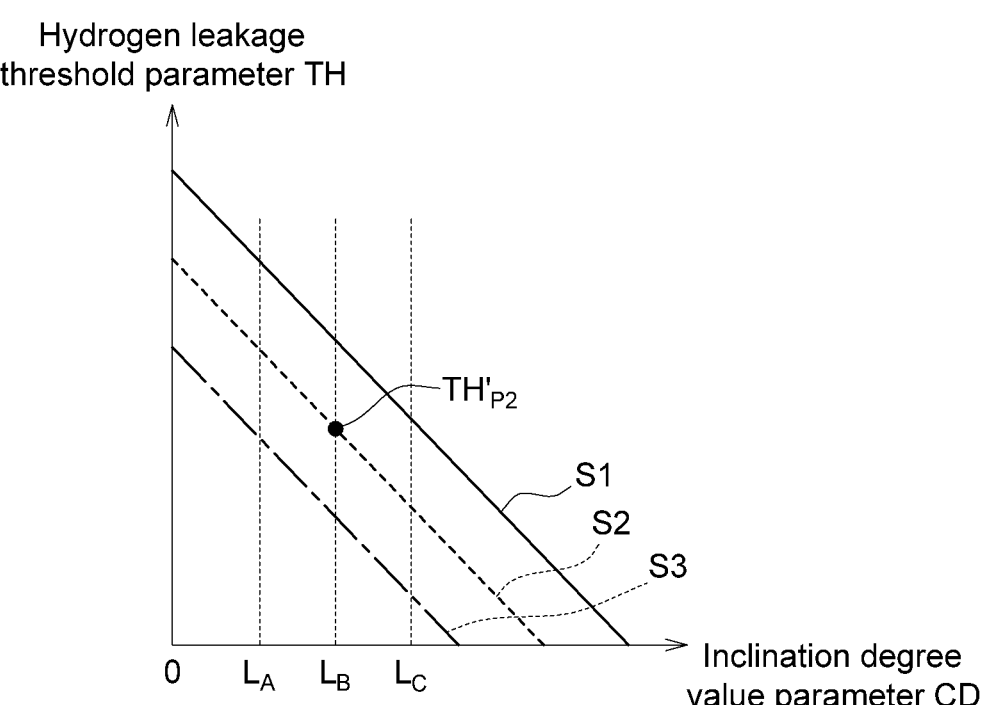
FIG. 5 illustrates a relationship diagram between the inclination degree value parameter CD and the hydrogen leakage threshold parameter TH of the vehicle according to another embodiment of the present disclosure.

Referring to FIG. 5, FIG. 5 illustrates a relationship diagram between the inclination degree value parameter CD and the hydrogen leakage threshold parameter TH of the vehicle 100 according to another embodiment of the present disclosure. The curve S1 represents the relationship curve when the vehicle 100 does not collide, and the curves S2 and S3 represent the relationship curves when the vehicle 100 collides, wherein a collision degree of the curve S3 is greater than a collision degree of the curve S2. For example, based on the same inclination degree value, the greater the collision degree is, the smaller the hydrogen leakage threshold is, and the lower the threshold for the initiating corresponding measure is. As a result, when a leakage occurs, the hydrogen leakage monitoring system 120 may immediately initiate the corresponding measures according to the inclination of the vehicle body, thereby immediately preventing the occurrence or expansion of the danger.

For example, as illustrated in FIG. 5, based on the inclination degree value in the same area $L_B$, when the collision degree belongs to the curve S2, the hydrogen leakage threshold value $TH'_{P2}$ corresponding to the area $L_B$ in the curve S2 is obtained. Then, the processor 124 determines whether the actual hydrogen leakage value PH is greater than the hydrogen leakage threshold $TH'_{P2}$, and initiate corresponding measure if the actual hydrogen leakage value PH is greater than the hydrogen leakage threshold TH'P2.

In an embodiment, the collision detection may be implemented by an acceleration sensor 125, for example. For example, the acceleration sensor 125 may sense the acceleration A of the vehicle body 110. The processor 124 is further configured to: obtain the hydrogen leakage threshold according to the acceleration A. For example, the corresponding relationship between the inclination degree value parameter CD and the hydrogen leakage threshold parameter TH is selected according to the acceleration A, and the hydrogen leakage threshold corresponding to the inclination degree value is obtained according to the selected corresponding relationship.

For further example, when the collision occurs, the instantaneous acceleration of the vehicle body 110 is negative and less than a preset value, and accordingly the processor 124 determines that the collision has occurred. From a plurality of the curves in FIG. 5 (i.e., In the corresponding relationship between the inclination degree value parameter CD and the hydrogen leakage threshold parameter TH), the processor 124 selects the corresponding curve (for example, curve S2) when the collision occurs, and in the selected curve, obtain the hydrogen leakage threshold corresponding to the inclination degree value by using the same method as mentioned above. In addition, the aforementioned "preset value" may be the acceleration value which may be determined as of the collision, for example.

Figure 6:
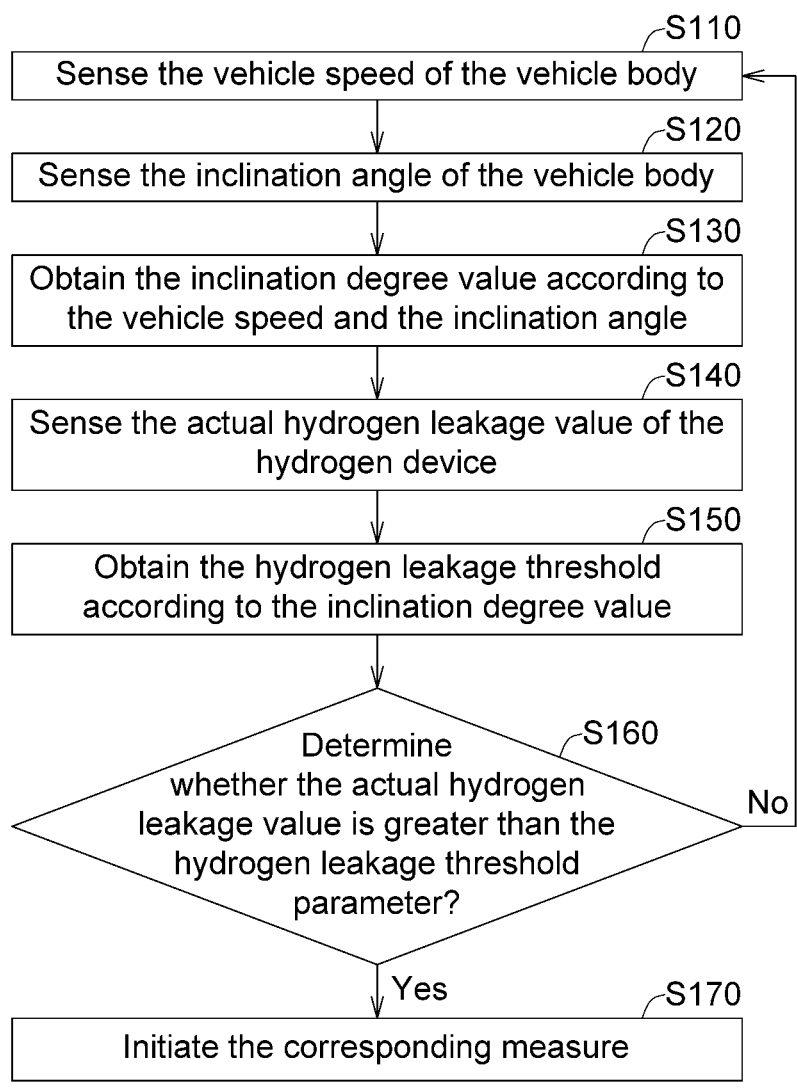
FIG. 6 illustrates a flow chart of the hydrogen leakage monitoring method of the vehicle in FIG. 1.

Referring to FIG. 6, FIG. 6 illustrates a flow chart of the hydrogen leakage monitoring method of the vehicle 100 in FIG. 1.

In step S110, the speed sensor 121 senses the vehicle speed V of the vehicle body 110.

In step S120, the inclination sensor 122 senses the inclination angle C of the vehicle body 110.

In step S130, the processor 124 obtains the inclination degree value according to the vehicle speed V and the inclination angle C. For example, the processor 124 obtains the inclination degree value corresponding to the measured vehicle speed V and inclination angle C according to the relationship between the vehicle speed V and the inclination angle C of the vehicle 100 in FIG. 2.

In step S140, the hydrogen concentration sensor 123 senses the actual hydrogen leakage value PH of the hydrogen device 10.

In step S150, the processor 124 obtains the hydrogen leakage threshold according to the inclination degree value. For example, the processor 124 obtains the hydrogen leakage threshold corresponding to the inclination value according to the relationship between the inclination degree value parameter CD and the hydrogen leakage threshold parameter TH of the vehicle 100 in FIG. 3.

In step S160, the processor 124 determines whether the actual hydrogen leakage value PH is greater than the hydrogen leakage threshold parameter TH. If so, the process proceeds to S170; if not, the process returns to step S110 to continue detecting the latest status of the vehicle body 110.

In step S170, the processor 124 initiate the corresponding measure (or security measure).

In summary, embodiments of the present disclosure propose a hydrogen leakage monitoring system, a vehicle using the same and a hydrogen leakage monitoring method using the same. In an embodiment, when hydrogen leakage occurs, it may be determined whether to initiate the safety measure according to the inclination degree of the vehicle body. In another embodiment, when hydrogen leakage occurs, it may be determined whether to initiate the safety measure according to the inclination degree and the acceleration of the vehicle body.

It will be apparent to those skilled in the art that various modifications and variations could be made to the disclosed embodiments. It is intended that the specification and examples be considered as exemplars only, with a true scope of the disclosure being indicated by the following claims and their equivalents.

What is claimed is:

1. A hydrogen leakage monitoring system, configured to be disposed on a vehicle body of a vehicle, and comprises:
   a speed sensor configured to sense a vehicle speed of the vehicle body;
   an inclination sensor configured to sense an inclination angle of the vehicle body;
   a hydrogen concentration sensor configured to sense an actual hydrogen leakage value of a hydrogen device; and

7 a processor configured to:

obtain an inclination degree value according to the vehicle speed and the inclination angle;

obtain a hydrogen leakage threshold according to the inclination degree value; and initiate a corresponding measure based on the actual hydrogen leakage value being greater than the hydrogen leakage threshold.

2. The hydrogen leakage monitoring system according to claim 1, wherein the processor is further configured to:

obtain a stationary time point of the vehicle speed being 0 based on the vehicle speed being 0; and obtain the inclination degree value according to the inclination angle and the vehicle speed at a time point before a period of time from the stationary time point.

3. The hydrogen leakage monitoring system according to claim 1, wherein the processor is further configured to:

obtain the hydrogen leakage threshold corresponding to the inclination degree value according to a corresponding relationship between an inclination degree value parameter and a hydrogen leakage threshold parameter;

wherein the inclination degree value is inversely proportional to the hydrogen leakage threshold.

4. The hydrogen leakage monitoring system according to claim 1, further comprising:

an acceleration sensor configured to sense an acceleration of the vehicle body;

wherein the processor is configured to:

obtain the hydrogen leakage threshold according to the acceleration.

5. The hydrogen leakage monitoring system according to claim 4, wherein the processor is further configured to:

select a corresponding relationship between an inclination degree value parameter and a hydrogen leakage threshold parameter according to the acceleration; and obtain the hydrogen leakage threshold corresponding to the inclination degree value according to the selected corresponding relationship.

6. A vehicle, comprising:

a vehicle body; and a hydrogen leakage monitoring system disposed on the vehicle body, and comprising:

a speed sensor configured to sense a vehicle speed of the vehicle body;

an inclination sensor configured to sense an inclination angle of the vehicle body;

a hydrogen concentration sensor configured to sense an actual hydrogen leakage value of a hydrogen device; and a processor configured to:

obtain an inclination degree value according to the vehicle speed and the inclination angle;

obtain a hydrogen leakage threshold according to the inclination degree value; and initiate a corresponding measure based on the actual hydrogen leakage value being greater than the hydrogen leakage threshold.

7. The vehicle according to claim 6, wherein the processor is further configured to:

obtain a stationary time point of the vehicle speed being 0 based on the inclination angle being equal to or greater than 90 degrees and the vehicle speed being 0; and obtain the inclination degree value according to the inclination angle and the vehicle speed at a time point before a period of time from the stationary time point.

8

8. The vehicle according to claim 6, wherein the processor is further configured to:

obtain the hydrogen leakage threshold corresponding to the inclination degree value according to a corresponding relationship between an inclination degree value parameter and a hydrogen leakage threshold parameter;

wherein the inclination degree value is inversely proportional to the hydrogen leakage threshold.

9. The vehicle according to claim 6, wherein the hydrogen leakage monitoring system further comprising:

an acceleration sensor configured to sense the acceleration of the vehicle body;

wherein the processor is configured to:

obtain the hydrogen leakage threshold according to the acceleration.

10. The vehicle according to claim 6, wherein the processor is further configured to:

select a corresponding relationship between an inclination degree value parameter and a hydrogen leakage threshold parameter according to the acceleration; and obtain the hydrogen leakage threshold corresponding to the inclination degree value according to the selected corresponding relationship.

11. A hydrogen leakage monitoring method, comprising:

sensing a vehicle speed of a vehicle body by a speed sensor;

sensing an inclination angle of the vehicle body by an inclination sensor;

obtaining an inclination degree value according to the vehicle speed and the inclination angle by a processor;

sensing an actual hydrogen leakage value of a hydrogen device by a hydrogen concentration sensor;

obtaining a hydrogen leakage threshold according to the inclination degree value by the processor; and initiating a corresponding measure based on the actual hydrogen leakage value being greater than the hydrogen leakage threshold by the processor.

12. The hydrogen leakage monitoring method according to claim 11, further comprising:

obtaining a stationary time point of the vehicle speed being 0 based on the vehicle speed being 0 by the processor; and obtaining the inclination degree value according to the inclination angle and the vehicle speed at a time point before a period of time from the stationary time point by the processor.

13. The hydrogen leakage monitoring method according to claim 11, further comprising:

obtaining the hydrogen leakage threshold corresponding to the inclination degree value according to a corresponding relationship between an inclination degree value parameter and a hydrogen leakage threshold parameter by the processor;

wherein the inclination degree value is inversely proportional to the hydrogen leakage threshold.

14. The hydrogen leakage monitoring method according to claim 11, further comprising:

sensing an acceleration of the vehicle body by an acceleration sensor;

obtaining the hydrogen leakage threshold according to the acceleration by the processor.

15. The hydrogen leakage monitoring method according to claim 14, further comprising:

selecting a corresponding relationship between an inclination degree value parameter and a hydrogen leakage threshold parameter according to the acceleration by the processor; and obtaining the hydrogen leakage threshold corresponding to the inclination degree value according to the selected corresponding relationship by the processor.

\* \* \* \* \*